L. F. REINKE & F. F. PARKER.
ADJUSTABLE STEERING KNUCKLE BOLT FOR AUTOMOBILES.
APPLICATION FILED OCT. 2, 1915.
1,181,612.
Patented May 2, 1916.
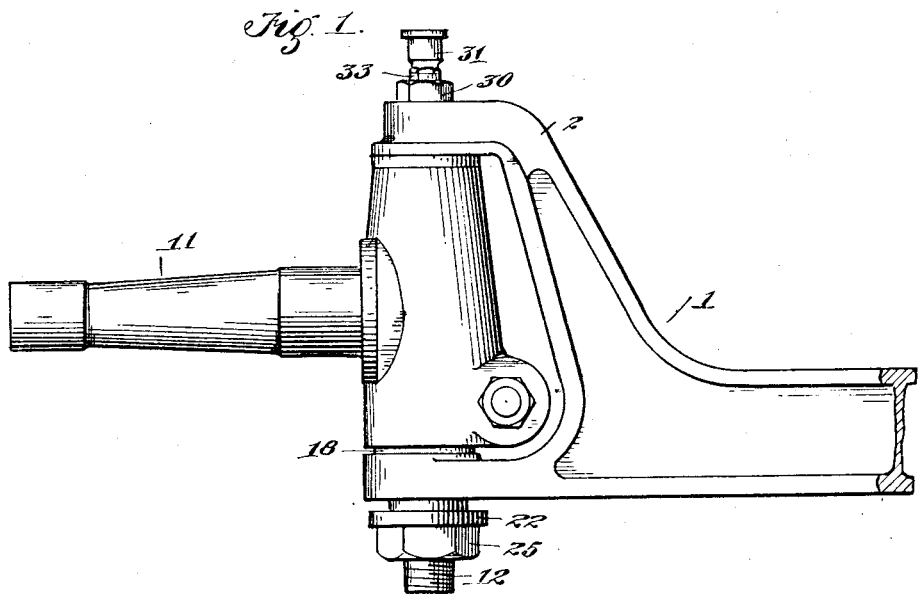
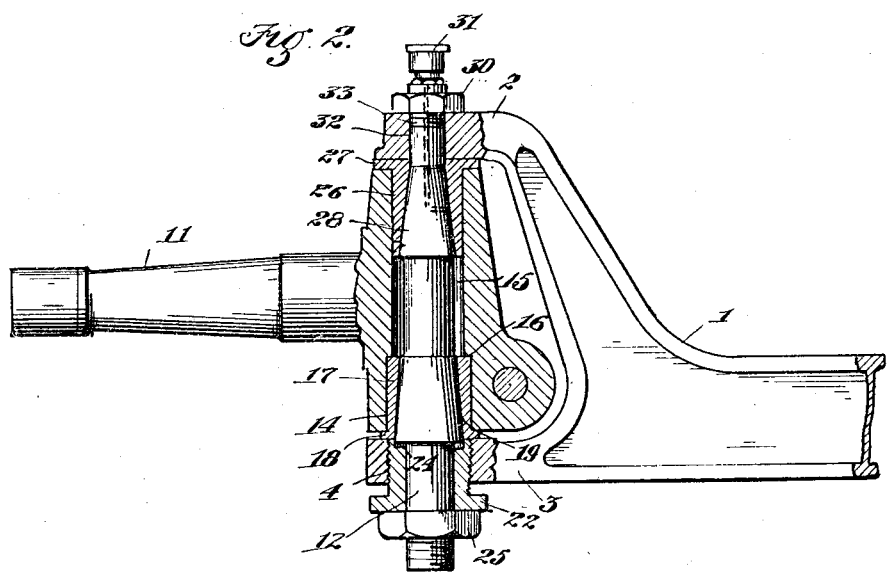
Inventors,
Louis F. Reinke.
Frank F. Parker
by Hazard Berry and Miller
attys.

UNITED STATES PATENT OFFICE.

LOUIS F. REINKE AND FRANK F. PARKER, OF RIVERSIDE, CALIFORNIA.

ADJUSTABLE STEERING-KNUCKLE BOLT FOR AUTOMOBILES.

1,181,612.  Specification of Letters Patent.  Patented May 2, 1916.

Application filed October 2, 1915. Serial No. 53,713.

*To all whom it may concern:*

Be it known that we, LOUIS F. REINKE and FRANK F. PARKER, citizens of the United States, residing at Riverside, in the county of Riverside and State of California, have invented new and useful Improvements in Adjustable Steering-Knuckle Bolts for Automobiles, of which the following is a specification.

Our invention relates to an improved adjustable steering knuckle bolt for automobiles.

The ordinary steering knuckle bolt which connects the wheel spindle to the end of the front axle of the automobile soon acquires a considerable amount of lost motion due to the wear thereof and of the movable parts engaging the same. A loose knuckle bolt is not only objectionable because of the rattling noise it causes when the automobile is in use but also on account of the lost motion which it causes between the steering gear and the knuckle bolt and which results that the steering gear fails to respond promptly to the control of the driver.

It is an object of our invention to construct a steering knuckle bolt which may be quickly adjusted to positively take up any wear between the same and the parts in engagement therewith, thereby avoiding the noise above referred to and maintaining the steering mechanism in a condition whereby the same will promptly respond to the action of the driver in governing his car.

Our invention consists in a steering knuckle bolt mounted in bushings at opposite ends thereof. The bushings are tapered in opposite directions and fit accurately around the bolt provided with tapered collars of a corresponding shape and size. Means are provided for vertically adjusting the knuckle bolt thereby taking up any lost motion between the bolt and the said bushings and maintaining a perfect engagement therebetween.

With this and other objects in view which will appear as the description proceeds, our invention consists of the construction and arrangement of parts hereinafter described and claimed.

In the accompanying drawings, which form a part of this specification, we have shown a convenient and practical embodiment of our invention, and in which—

Figure 1 is a front elevation showing the front axle assembly of an automobile provided with our improved adjustable steering knuckle bolt. Fig. 2 is a vertical cross section thereof showing the mounting of our bolt and parts in engagement therewith.

1 designates the end of the front axle of an automobile provided with upper and lower arms 2, 3, respectively.

11 is the wheel spindle connected thereto.

12 designates our improved knuckle bolt which is externally threaded at the ends. The axle engaging end of the spindle 11 is provided with a vertical cylindrical bore in which the knuckle bolt is mounted.

14 is the lower section of the cylindrical bore and is of slightly greater diameter than the upper section 15 of said bore and forms a circular shoulder 16 in said upper section against which the upper end of the lower bushing 17 is seated. Said bushing is provided with a circular flange 18 at its lower end which is disposed between the lower face of the end of the wheel spindle and the upper face of the lower arm 3. The bore of said bushing is of the shape of a frustated cone and adapted to fit snugly against a collar 19 of a corresponding shape and size and which is integral with the knuckle bolt 12. The lower end of the collar projects beyond the lower end of the bushing 14, for a purpose hereinafter described. The lower arm 3 of the front axle is provided with a bore 4 of the same size as the bore 14 in the lower end of the spindle 11. The same is internally threaded to receive an externally threaded nut 22. The upper end of said nut is provided with a circular recess 24 adapted to receive the lower end of the collar 19. A nut 25 engages the threaded lower end of the knuckle bolt and is screwed up against the lower face of the nut 22.

A bushing 26 is mounted in the upper end of the bore 15. The same is provided with a circular flange 27 at its upper end which engages the upper face of the upper end of the spindle. The bore of the upper bushing 26 is of the shape of an upright frustated cone and fits snugly on a collar 28 of the knuckle bolt of corresponding size and shape. The flange 27 of the bushing 26 is disposed between the upper face of the upper end of the spindle and the lower face of the upper arm 2 of the front axle. It will be noted that the upper arm 2 has a bore 32, which is of smaller diameter than bore 4 of the lower arm 3 and through which the reduced upper end 33 of the bolt projects. A nut 30 engages the upper threaded end of the knuckle bolt. An oil cup 31 mounted at the outer extremity of the knuckle bolt supplies oil to a bore in a longitudinal axis of the bolt.

The knuckle bolt is mounted in place as follows: The upper and lower bushings 26 and 17, respectively, are inserted in the bore of the end of the spindle. The spindle is then placed in position between the upper and lower arms of the front axle so that the bore in the spindle will register with the bores in said arms. The knuckle bolt is then inserted from below and the nut 22 is screwed into place in the lower arm of the axle. The upper and lower nuts 30 and 25 are now screwed into place on the respective ends of the knuckle bolt.

From the foregoing description it will be noted that the upper and lower spindle bushings are securely held in their respective places. When in the course of time the knuckle bolt and the spindle bushings have become worn causing lost motion between these parts, the nut 25 at the lower end of the bolt is loosened and the upper nut 30 is screwed down thereby raising the knuckle bolt to a slight extent. Owing to the conical taper of the collars of the bolt and of the bores of the bolt bushings, it will be obvious that the lost motion between the bolt and these bushings will be taken up thereby effecting a close fit between these parts.

Not only can the wear between the bolt and the bushings be taken up as just described, but also the wear between the upper face of the bushing 26 and the lower face of the upper arm 2, and between the lower face of the bushing 17 and the upper face of the nut 22 can be overcome by the adjustment of the nut 22. By tightening said nut, the vertical lost motion between the outer faces of the bushings and the parts in engagement therewith is eliminated. In this manner the bolt and the parts coöperating therewith may be maintained in close engagement without any lost motion in either a vertical or longitudinal direction. Another advantage of our improved bolt is that in case of fracture between the ends thereof, the lower section will be prevented from dropping out from its bearings and getting lost by the shoulder on the lower end of the lower bushing which abuts against the circular recess 24 in the top of nut 22.

The advantage of our adjustable knuckle bolt will be readily understood. It is obvious that by loosening the lower nut 25 and tightening the upper nut 30 the wear of the bolt and the bushings is quickly compensated thereby eliminating the noise incident to loose bearings and insuring perfect steering control.

While we have shown the preferred form of the adjustable knuckle bolt as now known to us, it is obvious that various changes in the arrangement and construction thereof may be made by those skilled in the art without departing from the spirit of our invention as covered by the appended claims.

We claim:

1. In combination, a front axle of an automobile, the end thereof having upper and lower arms provided with bores, a nut mounted in the bore of said lower arm, a wheel spindle provided with a cylindrical bore in its end, the lower section of said bore having a greater diameter than the upper section thereof, an adjustable steering knuckle bolt mounted in said cylindrical bore and in the perforated arms of said axle, said bolt being threaded at the ends and provided with a pair of spaced collars formed integral therewith and having the shape of upright frustated cones, a pair of bushings mounted on said bolt, having bores of a size and shape to fit said collars, and nuts engaging the threaded ends of said bolt whereby the same may be locked in adjusted position.

2. In combination, a front axle of an automobile, the end thereof having upper and lower arms provided with bores, a wheel spindle provided with a bore in its end, the lower section of said bore having a greater diameter than the upper section thereof, an adjustable steering knuckle bolt mounted in said bore and in the perforated arms of said axle, said bolt being threaded at the ends and provided with a pair of spaced collars formed integral therewith and having the shape of upright frustated cones, a pair of bushings mounted on said bolt and having bores of a size and shape to fit said collars, and nuts engaging the ends of said bolt whereby the same may be locked in adjusted position.

3. In combination, a front axle of an automobile, the end thereof having upper and lower arms provided with bores, a wheel spindle provided with a bore in its end, an adjustable steering knuckle bolt mounted in said spindle and said arms, said bolt being provided with a pair of collars formed integral therewith and having the shape of frustated cones, a pair of bushings mounted on said bolt and having bores of a size and shape to fit said collars, and nuts engaging the ends of said bolt whereby the same may be locked in adjusted position.

4. In combination, an adjustable steering knuckle bolt to be mounted in the ends of a front axle and a wheel spindle of an automobile, said bolt being provided with a pair of spaced collars formed integral therewith and having the shape of frustated cones, bushings mounted on said bolt and having bores of a size and shape to fit said collars, and adjustable locking means engaging the ends of said bolt.

5. In combination, an adjustable steering knuckle bolt to be mounted in the ends of a front axle and a wheel spindle of an automobile, said bolt being provided with a pair of spaced collars having the shape of frustated cones, bushings mounted on said bolt and having bores of a size and shape to fit said collars, and locking means engaging the ends of said bolt.

In testimony whereof we have signed our names to this specification.

LOUIS F. REINKE.
FRANK F. PARKER.